(12) United States Patent
Aldereguia et al.

(10) Patent No.: US 7,502,991 B2
(45) Date of Patent: Mar. 10, 2009

(54) REDUNDANT 3-WIRE COMMUNICATION SYSTEM

(75) Inventors: Alfredo Aldereguia, Cary, NC (US); Grace Ann Richter, Chapel Hill, NC (US); Jeffrey B. Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 11/170,951

(22) Filed: Jun. 30, 2005

(65) Prior Publication Data
US 2007/0022363 A1    Jan. 25, 2007

(51) Int. Cl.
G06F 11/00 (2006.01)
H03M 13/00 (2006.01)

(52) U.S. Cl. .................... 714/800; 714/746
(58) Field of Classification Search .......... 714/800, 714/48, 58
See application file for complete search history.

(56) References Cited

U.S. PATENT DOCUMENTS

| | | | |
|---|---|---|---|
| 4,823,347 A * | 4/1989 | Chin et al. ............ | 714/800 |
| 6,061,822 A * | 5/2000 | Meyer .................. | 714/758 |
| 6,411,506 B1 | 6/2002 | Hipp et al. | |
| 6,549,979 B1 | 4/2003 | Linnell | |
| 6,728,908 B1 * | 4/2004 | Fukuhara et al. ...... | 714/48 |
| 7,024,618 B2 * | 4/2006 | Luick ................... | 714/800 |

* cited by examiner

*Primary Examiner*—Shelly A Chase
(74) *Attorney, Agent, or Firm*—Martin McKinley, Esq.; Steven M. Greenberg, Esq.; Carey Rodriguez Greenberg & Paul LLP

(57) ABSTRACT

A redundant communication system for providing data communication between a first computing node and a second computing node. A transmitter is provided as part of the first computing node. A receiver is provided as part of the second computing node. A first signal line carries a first data signal. The first signal line electrically couples the transmitter with the receiver. A second signal line carries a second data signal redundant to the first signal. The second signal line electrically couples the transmitter with the receiver. The receiver evaluates the first data signal to determine the presence of an error and the second node uses the second data signal if an error is detected in the first data signal.

7 Claims, 2 Drawing Sheets

REDUNDANT 3-WIRE COMMUNICATION SYSTEM

BACKGROUND OF THE INVENTION

1. Statement of the Technical Field

The present invention relates to data communications and more particularly to a data communications system and method which uses error checking, a clock signal line and redundant data signal lines, e.g. three wires, to provide a redundant serial communication path between computing nodes.

2. Description of the Related Art

With multi-node computing systems, such as multi-node servers, becoming more popular, the demand for reliable communications between the nodes is increasing. A typical multi-node system includes a primary node, one or more secondary nodes whose operation is subservient to the primary node, and multiple service processors (or other system management hardware) for controlling the different nodes. The complexities of multi-node computing systems require sophisticated management such that the nodes in the system maintain awareness of the status of the other nodes.

Communication between the nodes is typically accomplished through the use of a predefined networking protocol, such as the Transmission Control Protocol/Internet Protocol (TCP/IP). However, packets using protocols such as TCP/IP add an undesirable latency in connection with the communication between nodes. This can be problematic for multi-node computing systems because the latency in packet delivery can cause a machine check in a node (Node A) when another node (Node B) resets or encounters an error. It is desirable for the operating node (Node A) to have real time data to prevent it from generating a machine check and acting on that unintended error.

A potential solution is to use a dedicated line of communication between the two nodes. Parallel communication links requires too many conductive paths, e.g., wires, which requires bigger connectors, thereby adding cost and consuming a significant portion of node connector area. Serial interfaces, such as Ethernet, Universal Asynchronous Receiver/Transmitter (UART) and Inter-IC (I2C) bus, each have drawbacks that do not lend themselves to solving the above-described problem. For example, Ethernet requires a significant amount of logic (macro-cells) and physical size to implement. Like Ethernet, the use of a UART requires a significant amount of logic (macro-cells) and physical size to implement. This also increases the cost of implementation. Ethernet and UARTs are therefore impractical as solutions. I2C is simple and facilitates low-latency communications, but it does not provide any way to check for, or deal with, errors in the data transmission. As such, error-free packet delivery is not guaranteed.

In addition, Ethernet, UARTs and I2C provide no signal path redundancy. Also, if the link path is noisy, clock recovery can be used for the clock, but not for data. If one wire or signal line fails, communication between the end nodes terminates. It is therefore desirable to have a system and method which minimizes the quantity of communication signal lines between nodes, but still provides a redundant path and guaranteed packet delivery through an error checking process.

SUMMARY OF THE INVENTION

The present invention addresses the deficiencies of the art in respect to authentication and provides a novel and non-obvious communication multi-wire communication system for communication between pairs of nodes in a multi-node computing system. In this regard, the system makes use of a redundant signal path, for example a 3-wire signal path, and parity checking along with a modified I2C communication protocol to provide a redundant and reliable low latency communication system.

According to one aspect, the present invention provides a redundant communication system for providing data communication between a first computing node and a second computing node. A transmitter is provided as part of the first computing node. A receiver is provided as part of the second computing node. A first signal line carries a first data signal. The first signal line electrically couples the transmitter with the receiver. A second signal line carries a second data signal redundant to the first signal. The second signal line electrically couples the transmitter with the receiver. The receiver evaluates the data signal to determine the presence of an error and the second node uses the second data signal if an error is detected in the first data signal.

According to another aspect, the present invention provides a method for data communication between a first computing node and a second computing node in which a transmitter in the first computing node is electrically coupled with a receiver in the second computing node using a first signal line carrying a first data signal. The transmitter in the first communication node is also electrically coupled with the receiver in the second communication node using a second signal line carrying a second data signal in which the second signal line is separate from the first signal line. The first data signal is evaluated to determine the presence of an error. The second data signal is used if an error is detected in the first data signal.

According to still another aspect, a machine readable storage device having stored thereon a computer program for redundant data communication between a first node and a second node is provided in which a transmitter in the first computing node is electrically coupled with a receiver in the second computing node using a first signal line carrying a first data signal and the transmitter in the first communication node is also electrically coupled with the receiver in the second communication node using a second signal line carrying a second data signal, the second signal line being separate from the first signal line. The computer program includes a set of instructions which when executed by a machine causes the machine to perform a method including evaluating the first data signal to determine the presence of an error and using the second data signal if an error is detected in the first data signal.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention advantageously provides multi-wire communication system and method for communication between pairs of nodes in a multi-node computing system. The invention provides a redundant signal path, for example a 3-wire signal path, and parity checking along with a modified I2C communication protocol to provide a low latency communication system suitable for facilitating communication between nodes.

Figure 1:
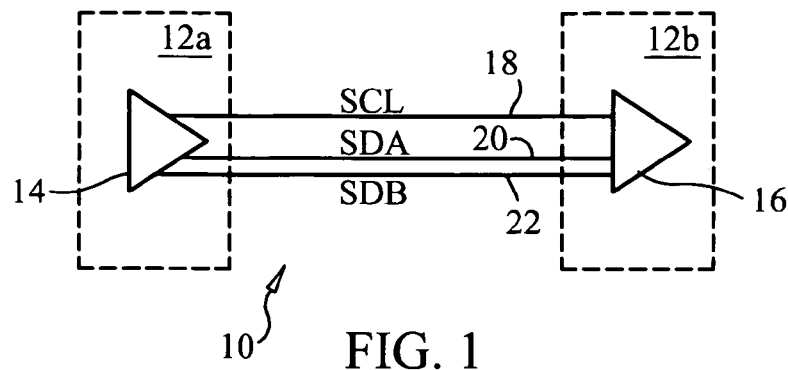
FIG. 1 is a block diagram of a communication system constructed in accordance with the principles of the present invention.

Referring now to the drawing figures in which like reference designators refer to like elements there is shown in FIG. 1 an internodal communication system constructed in accordance with the principles of the present invention and designated generally as "10". Internodal communication system 10 includes computing nodes 12a and 12b (referred to collectively herein as "nodes 12"). Nodes 12 include transmitter 14 and receiver 16. Of note, although node 12a shows only transmitter 14 and node 12b shows only receiver 16, although not shown in FIG. 1 for ease of explanation, it is understood that node 12a includes a receiver and node 12b includes a transmitter.

In the embodiment shown in FIG. 1, transmitter 14 and receiver 16 are electrically connected by three signal lines, e.g. wires, namely a clock signal 18 (SCL), a first data signal line 20 (SDA) and a second data signal line 22 (SDB). As is described below in detail, SDB 22 carries a data signal that is redundant to the data signal carried by SDA 20.

Nodes 12 can be any computing devices, such as may be found in a multi-node server platform. It is presumed that one of skill in the art understands that, in addition to transmitter 14 and receiver 16, nodes 12 include other hardware and software components used to allow nodes 12 to perform their intended function, such central processing units, volatile and non-volatile storage, input/output hardware and devices, internal bus, etc. Nodes 12 can, for example, be server blades, service processor or management hardware, and the like.

From a hardware perspective, transmitter 14 can be based on I2C technology. This arrangement advantageously provides a low transmission latency design that requires few macro-cells (logic) to implement. However, unlike the present invention, known I2C transmitters and receivers are arranged to support a single data signal line. As shown in FIG. 1, the transmitter and receiver of the present invention provide two signal lines, SDA 20 and SDB 22. This double signal line arrangement adds another signal line to the traditional I2C system. While additional logic and drive circuitry are required to create and drive the redundant SDB 22 signal, the increase in requirements is minimal due to the simple structure of I2C communication systems. Receiver 14 is arranged to drive the data signal on two signal lines.

The clock signal line, SCL 18, is common to the sending and receiving nodes 12 and is driven by the master node 12. The master node 12 is determined off-line by the system management software. Once the master has been established, it drives the common clock on the clock signal line from transmitter 14 and, in turn, to the receiving port on receiver 16.

While the above described hardware arrangement provides a redundant data signal path, a determination can additionally be made to determine whether the data signal received on SDA 20 is valid. The present embodiment of the invention uses parity checking to verify the integrity of the data received at receiver 16 on SDA 20 and SDB 22. Parity checking in accordance with the present invention is described with reference to FIGS. 2-4.

Figure 2:
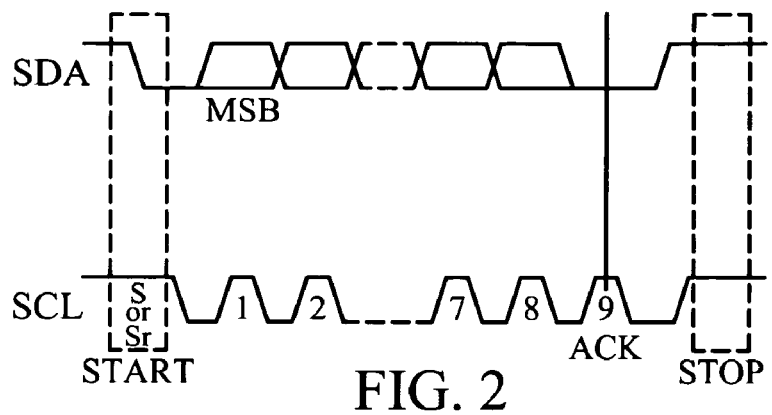
FIG. 2 is a timing diagram of a prior art I2C communications system.

FIG. 2 is a timing diagram of a prior art I2C communications system. In the prior art, the data (SDA) and clock (SCL) are bi-directional and a plurality of devices are typically coupled to these lines. Accordingly, when the line is idle, a master device seizes the line and initiates a start condition and identifies the slave on the bus that will be the receiver of the data. Once the address has been transmitted, as shown in FIG. 2, a normal I2C data transmission includes a start condition, then eight data bits. After the eighth bit has been transmitted, the receiving slave device pulls the SDA line low in the next clock signal to acknowledge receipt of eight bits. However, even if the receiver makes such an acknowledgement, there is no way to know whether the transmission was error-free. A stop condition may follow.

As such, the I2C protocol has several phases of operation, namely, start, device addressing, acknowledgement, data (optional) and stop. However, because the present embodiment of the invention uses node-to-node communications (see FIG. 1), the addressing phase of traditional I2C is not required. The present arrangement will still allow I2C devices that do not employ parity checking (as discussed below) to function.

Figure 3:
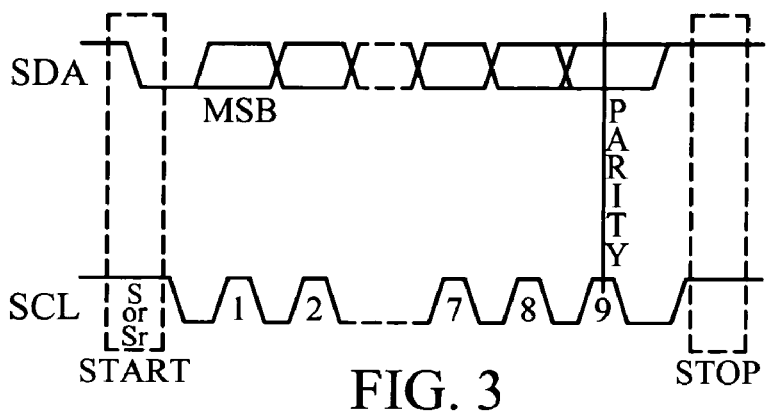
FIG. 3 is a timing diagram of a data signal with a parity bit constructed in accordance with the principles of the present invention.

The addition of parity checking to the I2C protocol is described with reference to FIG. 3. FIG. 3 is a timing diagram of a data signal with a parity bit constructed in accordance with the principles of the present invention. Communications between the transmitting and receiving nodes is bi-directional. However, it is also contemplated that uni-directional signal lines can be used, and a corresponding receiver transmitter pair provided (not shown). In the case of uni-directional communications, there is no need for the receiver to pull the SDA line low to indicate an acknowledgement. In either case, this time period can be used to include the transmission of a ninth bit, namely a parity bit.

Receiver 16 can perform parity checking on the eight transmitted bits to determine whether the transmission was error-free. If the transmission was error-free, receiver 16 can turn around signal lines SDA 20 and SDB 22 and use these lines (or the other uni-directional node-to-node communication signal line for example SDA from node 12b to node 12a) to acknowledge error-free receipt of the data byte. In the event of a failure, e.g., bad parity check, the receiving node, e.g., node 12b, sends a retry command to transmitting node, e.g. node 12a. Of note, although the present invention is described in terms of parity bits and parity checking, it is contemplated that other error checking and acknowledgement methodologies can be used.

Figure 4:
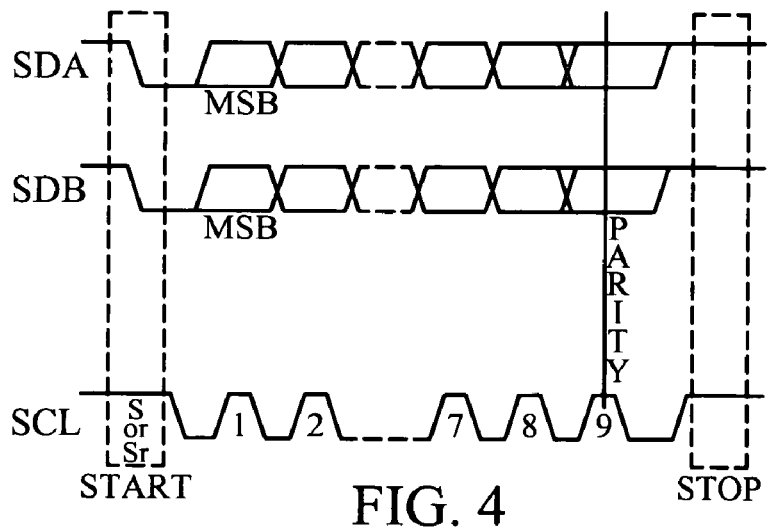
FIG. 4 is a timing diagram of redundant data signals each having a parity bit constructed in accordance with the principles of the present invention.

The use of redundant physical connections combined with parity checking is described with reference to FIGS. 1 and 4. FIG. 4. is a timing diagram of redundant data signals each having a parity bit constructed in accordance with the principles of the present invention. The main difference between the timing diagram of FIG. 3 and that of FIG. 4 is that FIG. 4 shows that parity bits are included as part of both SDA 20 and SDB 22. This advantageously allows receiver 16 the opportunity to parity check the data received on SDB 22 if the data received on SDA 20 is determined to have an error.

Figure 5:
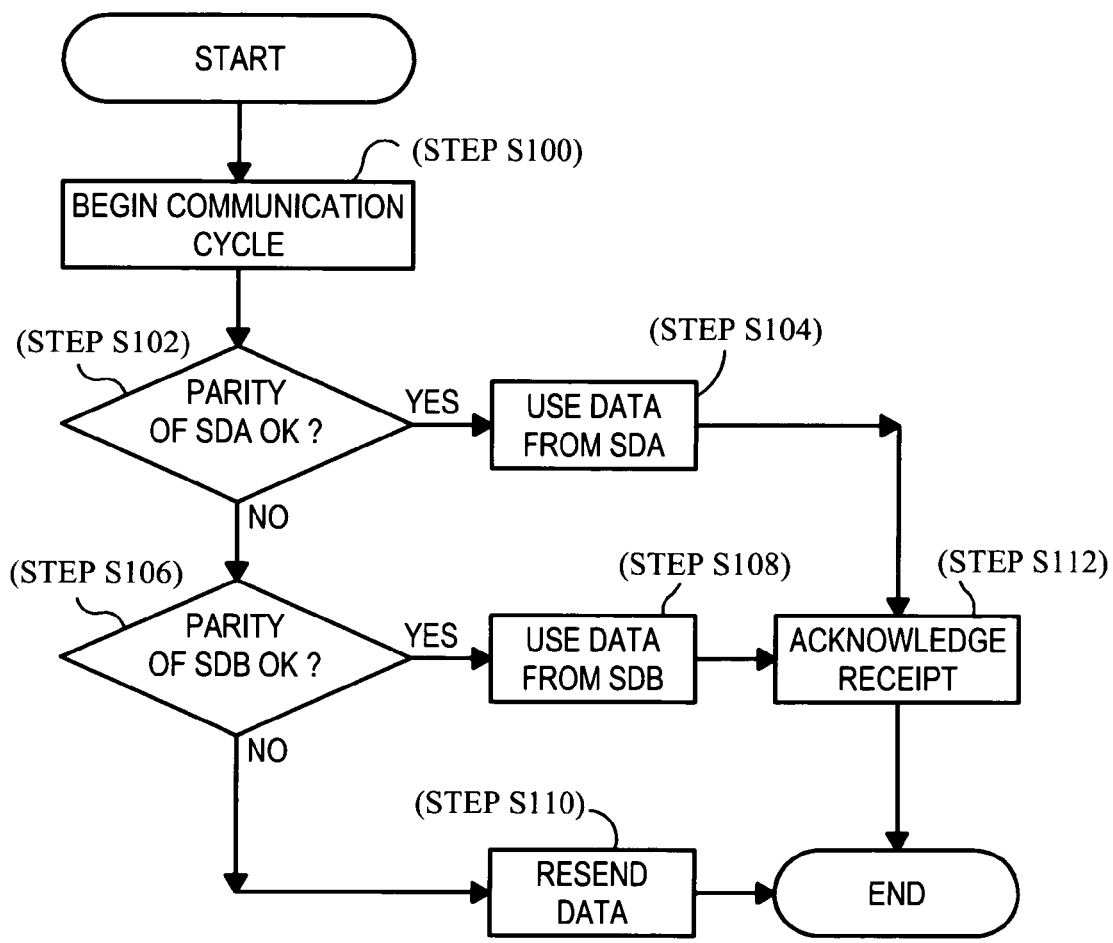
FIG. 5 is a flow chart of a data communication process of the present invention.

The overall operation of the present invention is explained with reference to FIG. 5. FIG. 5 is a flow chart of a data communication process of the present invention. Initially, a data communication cycle is commenced (Step S100). Such commencement can be initiation of an I2C start condition on SDA 20 and SDB 22 and the transmission of a data byte. Once the communication cycle is started and data has been transmitted on SDA 20 and SDB 22, receiver 16 evaluates the data received on SDA 20, such as by parity checking the data, to determine whether the transmission on SDA 20 was error free (Step S102). If the parity check is OK, i.e., the data was received error-free, node 12b will use the data byte (Step S104).

If the evaluation (parity check) of the data received on SDA 20 determines the presence of an error (Step S102), receiver 16 evaluates the data received on SDB 22 to determine whether that data is error-free, i.e., passes parity checking (Step S106). If the parity check of the data received on SDB 22 shows the data was received error-free, node 12b will use the SDB 22 data byte (Step S108). If the evaluation (parity check) of the data received on SDB 22 determines the presence of an error (Step S106), node 12b transmits a resend request and/or a no acknowledgement to node 12a (Step S110). In either case where parity checking of the data received on SDA 20 and/or SDB 22 reveals an error, it is contemplated that the system can initiate and perform diagnostics to determine whether a chronic or critical condition exists. In the case where data was received successfully, node 12b sends an acknowledgement on the bi-directional SDA 20 and SDB 22 or the uni-directional transmitter/receiver pair used to support communications from node 12b to node 12a.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A redundant communication system for providing data communication between a first computing node and a second computing node, the communication system comprising:
   a transmitter provided as part of the first computing node;
   a receiver provided as part of the second computing node;
   a first signal line carrying a first data signal, the first signal line electrically coupling the transmitter with the receiver;
   a second signal line carrying a second data signal redundant to the first signal, the second signal line electrically coupling the transmitter with the receiver; and
   the receiver evaluating the first data signal to determine the presence of an error, the second node using the second data signal if an error is detected in the first data signal.

2. The system of claim 1, further comprising a clock signal line electrically coupling the transmitter with the receiver.

3. The system of claim 1, wherein both the first data signal and the second data signal include a parity bit, wherein evaluating the first data signal to determine the presence of an error includes using the parity bit to parity check the received first data signal.

4. The system of claim 3, wherein, if the first data signal is determined to have an error, the receiver uses the second data signal by further evaluating the second data signal to determine the presence of an error.

5. The system of claim 4, wherein the second node transmits at least one of a resend request and a no acknowledgement to the first node if the second data signal is determined to have an error.

6. The system of claim 5, wherein the first communication signal line and the second communication signal line are bi-directional, and wherein the at least one of the resend request and no acknowledgement is transmitted from the second node to the first node using the first data signal line and the second data signal line.

7. The system if claim 6, wherein the electrical characteristics of the transmitter correspond to the electrical characteristics of an I2C transmitter and the electrical characteristics of the receiver correspond to the electrical characteristics of an I2C receiver.

* * * * *